(12) United States Patent
Kobayashi et al.

(10) Patent No.: US 8,845,955 B2
(45) Date of Patent: Sep. 30, 2014

(54) HEAT TREATMENT FURNACE (75) Inventors: Toshiharu Kobayashi, Tsukuba (JP); Hiroshi Harada, Tsukuba (JP); Kaoru Sugita, Iruma (JP); Jun Tasaki, legal representative, Iruma (JP); Katsunori Kikuchi, Iruma (JP)

(73) Assignees: National Institute for Materials Science, Ibaraki (JP); Nissin Giken Co., Ltd., Saitama (JP)

( * ) Notice: Subject to any disclaimer, the term of this patent is extended or adjusted under 35 U.S.C. 154(b) by 305 days.

(21) Appl. No.: 13/376,946

(22) PCT Filed: Jun. 8, 2010

(86) PCT No.: PCT/JP2010/059723
§ 371 (c)(1),
(2), (4) Date: Feb. 21, 2012

(87) PCT Pub. No.: WO2010/143640
PCT Pub. Date: Dec. 16, 2010

(65) Prior Publication Data
US 2012/0133089 A1    May 31, 2012

(30) Foreign Application Priority Data

Jun. 8, 2009    (JP) ................................ 2009-136824

(51) Int. Cl.
| | | |
|---|---|---|
| C21D 1/74 | (2006.01) | |
| H05B 6/10 | (2006.01) | |
| C21D 9/00 | (2006.01) | |
| F27B 5/14 | (2006.01) | |
| H05B 6/36 | (2006.01) | |
| F27B 5/04 | (2006.01) | |
| F27D 15/02 | (2006.01) | |
| C21D 1/62 | (2006.01) | |
| F27B 5/02 | (2006.01) | |
| C22F 1/10 | (2006.01) | |
| H05B 6/44 | (2006.01) | |
| F27D 9/00 | (2006.01) | |
| C21D 1/40 | (2006.01) | |
| F27B 5/12 | (2006.01) | |
| C22F 1/00 | (2006.01) | |

(52) U.S. Cl.
CPC ...... *F27B 5/02* (2013.01); *H05B 6/101* (2013.01); *C21D 9/0062* (2013.01); *F27B 5/14* (2013.01); *H05B 6/36* (2013.01); *F27B 5/04* (2013.01); *F27D 15/02* (2013.01); *C21D 1/62* (2013.01); *C22F 1/10* (2013.01); *C22F 1/002* (2013.01); *H05B 6/44* (2013.01); *C21D 9/0018* (2013.01); *F27D 9/00* (2013.01); *C21D 1/40* (2013.01); *F27B 5/12* (2013.01)
USPC .......................................... 266/250; 266/155

(58) Field of Classification Search
CPC ........................................................ F27B 5/04
USPC ................................... 266/155, 249, 250
See application file for complete search history.

(56) References Cited

U.S. PATENT DOCUMENTS

2012/0133089 A1* 5/2012 Kobayashi et al. ........... 266/155

FOREIGN PATENT DOCUMENTS

| JP | 60-20082 | 2/1985 |
|---|---|---|
| JP | 2003-100643 | 4/2003 |
| JP | 2005-273931 | 10/2005 |
| JP | 2005-299990 | 10/2005 |

OTHER PUBLICATIONS

International Search Report issued Aug. 17, 2010 in corresponding International (PCT) Application No. PCT/JP2010/059723.

* cited by examiner

*Primary Examiner* — Scott Kastler
(74) *Attorney, Agent, or Firm* — Wenderoth, Lind & Ponack, LLP.

(57) ABSTRACT

A heating section 20 having heating elements using carbon which generates heat when a high-frequency electric current is fed to a coil whose pitch can be adjusted as desired is arranged in a heating chamber 10. A cooling chamber 80 configured to cool metal is disposed below the heating chamber 10 in communication with the heating chamber 10 via a connection section 60. A water-cooled vertically movable shaft 90 which is capable of supporting the metal to be heat-treated and entering the heating chamber 10 is disposed so as to penetrate through the bottom portion of the cooling chamber 80. A gas introducing pipe 81 configured to introduce gas for cooling heated metal to be heat-treated supported by the water-cooled vertically movable shaft 90 and moved from the heating chamber 10 to the cooling chamber 80 is disposed in the cooling chamber 80.

10 Claims, 10 Drawing Sheets

HEAT TREATMENT FURNACE

BACKGROUND OF THE INVENTION (1) Field of the Invention

The present invention relates to a heat treatment furnace. More specifically, the invention is intended to provide a heat treatment furnace for a treatment performed by keeping metal at a high temperature for a certain period and then cooling rapidly the same, which achieves a reduction of running cost and an increase in cooling speed.

(2) Description of Related Art

For example, Ni(nickel)-based superalloy makes full use of its strength when it has a coherent structure in which γ (gamma: alloy matrix) and γ' (gamma prime; $Ni_3Al$) are in a coherent array. In order to obtain the coherent structure of the γ/γ' which provides a maximum strength, a heat treatment method of increasing the temperature of the alloy to a temperature closest to a fusing temperature (on the order of 1350° C.), and keeping it for a certain period (on the order of 40 hours) for homogenization, and then cooling the alloy rapidly is required. In this case, the quicker the cooling speed, the better the high precision of the coherent structure formed at the high temperature is maintained, and the higher alloy strength is demonstrated.

Thus, conventionally, a gas fan cooling furnace has been used as means for heating the alloy to a high temperature and then cooling rapidly the same. An example of configuration will be described with reference to FIG. 10. Here, FIG. 10 is a front view schematically showing the configuration in the related art partly in cross section.

Figure 10:
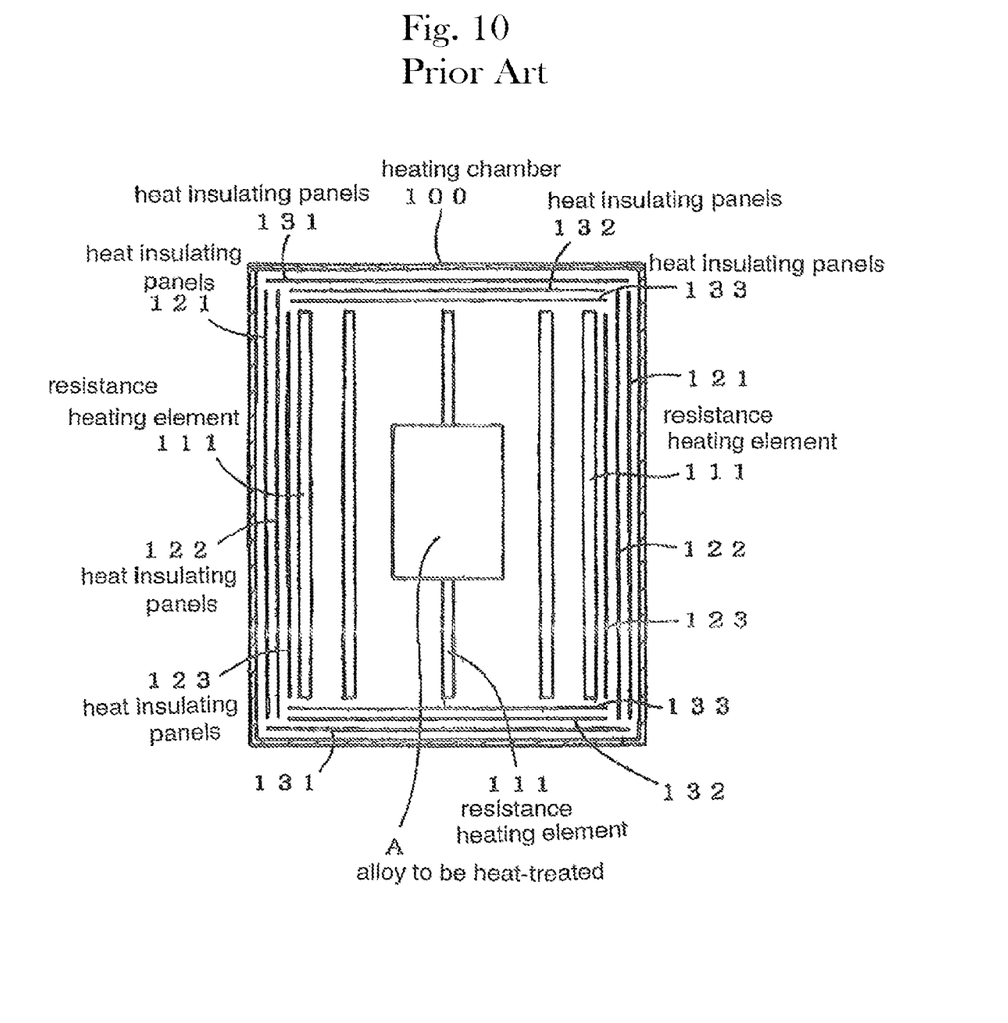
FIG. 10 is a front view showing a configuration of an example of a related art partly in cross section.

In FIG. 10, a heating chamber 100 is formed into a sealed cylindrical barrier shape, and includes a plurality of rod shaped resistance heating elements 111 in the interior thereof in a cylindrical fence pattern. Examples of the material used for the resistance heating elements 111 includes W (tungsten) and Mo (molybdenum).

Cylindrical heat insulating panels 121 to 123 having different diameters respectively are disposed triply so as to surround the plurality of resistance heating elements 111, and a disk-shaped heat insulating panels 131 to 133 are disposed so as to cover upper and lower openings of the heat insulating panels 121 to 123. The W or Mo is also used as a material for the heat insulating panels 121 to 123 and 131 to 133.

When heating the alloy to a temperature close to the fusing point using the heat treat furnace having such a configuration, an alloyA to be heat-treated is arranged at a center portion of a space surrounded by the plurality of resistance heating elements 111 and then air in the interior of the heating chamber 100 is evacuated. Then, when an electric current is fed to the respective resistance heating elements 111, the respective resistance heating elements 111 generate Joule heat, heat up the alloyA to be heat-treated to a temperature close to the fusing point using radiant heat as a heat source, and keep this state for a certain period.

When the certain period has elapsed, electricity having been distributed to the respective resistance heating elements 111 is stopped, high-purity He (helium) gas or Ar (Argon) gas is supplied into the heating chamber 100 as cooling gas via a gas inlet port, not shown, and is blown onto the alloyA to be heat-treated to cool the same. When the heating chamber 100 is filled with the supplied cooling gas, a fan (not shown) is driven to forcedly stir the cooling gas.

In this manner, in the related art, the W or Mo is used as the material of the resistance heating elements 111 and the heat insulating panels 121 to 123 and 131 to 133, and heating of the alloyA to be heat-treated and cooling of the heated alloyA to be heat-treated are performed in the identical space.

Patent Document 1-JP A 7 218144

BRIEF SUMMARY OF THE INVENTION

However, the related art shown in FIG. 10 for example, although the configuration is simple, has the following problems. First of all, although the alloy strength is increased with an increase of number of times of repetition of a heating and cooling cycle, if the heating and cooling cycle is repeated, significant wear results of the W or Mo used as a material for the resistance heating element 111 and the heat insulating panels 121 to 123 and 131 to 133. As such, if the frequency of usage is high, replacement is required after 1 year or so of use.

However, the W and Mo are rare metal and are extremely expensive. When replacing the resistance heating elements 111 and the heat insulating panels 121 to 123 and 131 to 133, a cost on the order of 50% of the heat treat furnace is required. Therefore, according to the related art shown in FIG. 10, the running cost is extremely high including a point in which the He gas or the Ar gas, which may cause a cost increase, is used as the cooling gas.

Secondly, in the related art shown in FIG. 10 for example, the heating of the alloyA to be heat-treated and cooling of the heated alloyA to be heat-treated are performed in the identical space. In other words, when cooling the heated alloyA to be heat-treated for a certain period, the cooling gas is supplied to the heating chamber 100 having been heated and hence raised to a high temperature. Therefore, the cooling speed of the alloyA to be heat-treated using the cooling gas is slow and, for example, when cooling from a temperature around 1300° C., the cooling speed is 150° C./min. at most, which is insufficient as the cooling speed.

As described above, the higher the cooling speed, the better alloy strength is obtained. However, since the cooling velocity is slow when the heating of the alloyA to be heat-treated and the cooling of the heated alloyA to be heat-treated are performed in the identical space, the strength of the alloyA to be heat-treated cannot be demonstrated sufficiently. The related art shown in FIG. 10 has the problems to be solved as described above.

The present invention is provided to solve the above-described problems. In order to do so, in the present invention, heating elements using carbon are arranged in a heating chamber. The heating elements using carbon generate heat when a high-frequency current is fed to a coil whose pitch can be adjusted as desired. A cooling chamber configured to cool metal to be heat-treated, which has been heated by the heating elements, is disposed below the heating chamber in communication with the heating chamber. A water-cooled vertically movable shaft which is capable of supporting the metal to be heat-treated and entering the heating chamber is disposed so as to penetrate through the bottom portion of the cooling chamber. Gas for cooling the heated metal to be heat-treated, which is supported by the water-cooled vertically movable shaft and transferred from the heating chamber to the cooling chamber, is supplied to the cooling chamber. Means as described above is used in the present invention.

A heat treatment furnace according to the present invention may have the following characteristics.

[1] A heat treatment furnace including:

<1> a heating chamber configured to heat metal to be heat-treated and provided with a heating portion including a coil supported so that pitches thereof can be adjusted as desired and a heating element using carbon which generates heat when an electric current is fed to the coil;

<2> a cooling chamber provided below the heating chamber and configured to cool the metal to be heat-treated, which has been heated by the heating portion;

<3> a hollow connection section configured to connect the heating chamber and the cooling chamber and provided with a movable gate which partitions the heating chamber and the cooling chamber;

<4> a first movable heat-shield panel arranged in a lower portion in the heating chamber and configured to shield heat from the heating chamber;

<5> a second movable heat-shield panel arranged in an upper portion in the cooling chamber and configured to shield heat of the heated metal to be heat-treated from being transferred to the gate; and <6> a water-cooled vertically movable shaft disposed through the bottom portion of the cooling chamber, configured to be capable of supporting the metal to be heat-treated and entering the heating chamber.

[2] The heat treatment furnace according to the above-described configuration [1] wherein
the cooling chamber includes:
a gas introducing pipe provided with a fan therein configured to pump gas for introducing gas for cooling the heated metal to be heat-treated, which is supported by the water-cooled vertically movable shaft and moved from the heating chamber to the cooling chamber, into the cooling chamber;
a gas exhaust pipe configured to exhaust the gas introduced into the cooling chamber through the gas introducing pipe from the cooling chamber; and
a heat exchanger configured to exchange heat with the gas disposed in an interior of at least one of the gas introducing pipe and the gas exhaust pipe.

[3] The heat treatment furnace according to the above-described configuration [1], wherein
the cooling chamber includes:
a ring-shaped gas supply pipe configured to supply the gas for cooling the heated metal to be heat-treated, the gas supply pipe having a number of nozzles configured to eject the gas supplied thereto via the gas supply pipe; and
the gas exhaust pipe configured to exhaust the gas ejected via the nozzles.

According to the present invention, carbon which is inexpensive and worn only by a minute amount is used as the heating element and is caused to generate heat by an induction heating system and, simultaneously, the heating chamber and the cooling chamber are formed as separate spaces, and inexpensive $N_2$ (nitrogen) gas can be used as the cooling gas. Therefore, the running cost required when operating the heat treat furnace can be significantly reduced. There is little necessity to replace consumable supplies other than a thermocouple even when the furnace is used for several years.

In addition, by using the carbon for the heating element, a highest operating temperature can be set to 1700° C. or higher and pitches of an induction coil can be adjusted according to sizes or shapes of alloy to be heated. Therefore, a uniform heating property, that is, uniformity of temperature distribution in a heating space can be ensured in the range of ±5° C.

In addition, because the heating chamber and the cooling chamber are formed as the separate spaces instead of being formed as the identical space, and the heated alloy to be heated is moved from the heating chamber at a high temperature to the cooling chamber which is not heated, a high cooling speed is achieved, and a high strength alloy is realized. Therefore, effects brought about by the present invention are extremely significant in terms of practical use.

DETAILED DESCRIPTION OF THE DRAWINGS

DETAILED DESCRIPTION OF THE INVENTION

In a heat treatment furnace according to the present invention, a carbon-made heating element which generates heat when a high-frequency current is fed to a coil whose pitch can be adjusted as desired is disposed in a heating chamber as heating means for heating a metal to be heat-treated. A cooling chamber configured to cool the heated metal to be heat-treated is disposed below the heating chamber. The heating chamber and the cooling chamber are connected by a hollow connection section and a vacuum gate valve configured to partition the heating chamber and the cooling chamber and separate atmospheres in both chambers is provided in the connection section. A movable heat-shield panel configured to block heat from the heating chamber is disposed in a lower portion in the heating chamber and a movable heat-shield panel configured to block heat transferred from the heated metal to be heat-treated to the vacuum gate valve is disposed in an upper portion in the cooling chamber. A water-cooled vertically movable shaft which is capable of supporting the metal to be heat-treated and entering the heating chamber is disposed so as to penetrate through the bottom portion of the cooling chamber. A gas introducing pipe configured to introduce cooling gas into the cooling chamber and provided with a fan for pumping gas in the interior thereof and a gas exhaust pipe configured to exhaust the gas introduced into the cooling chamber to the outside are provided in the cooling chamber. A heat exchanger configured to exchange heat with gas is disposed in an interior of at least one of the gas introducing pipe and the gas exhaust pipe. Detailed description on the basis of embodiments will be given below.

Figure 1:
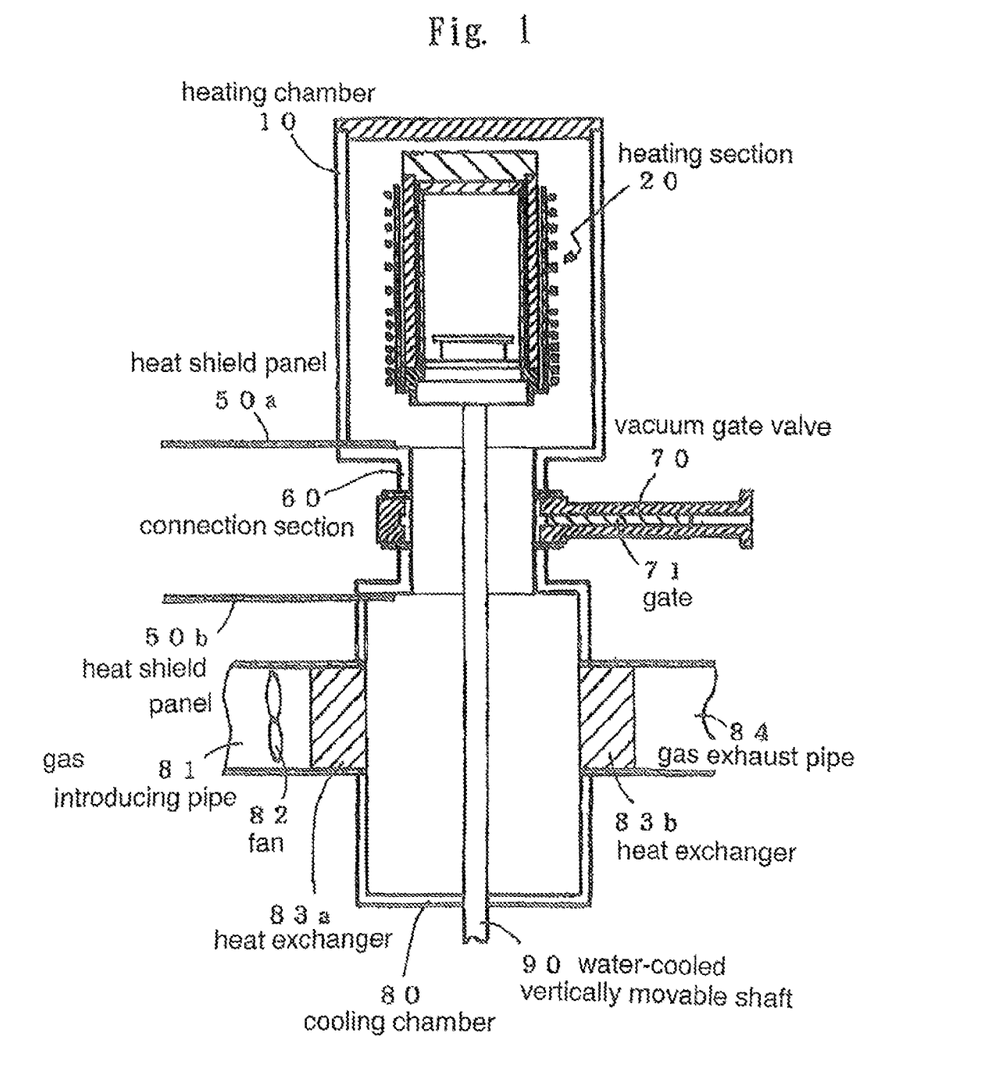
FIG. 1 is a front view showing a configuration of an embodiment of the present invention partly in cross section.

A configuration of an embodiment of the present invention is shown in FIG. 1 and will be described with reference thereto. Here, FIG. 1 is a front view showing a configuration of a heat treatment furnace in this embodiment partly in cross section.

In FIG. 1, the heat treatment furnace according to this embodiment is configured in such a manner that a cylindrical boiler shaped cooling chamber 80 configured to cool a heated alloy to be heated is disposed below a cylindrical boiler shaped heating chamber 10 provided with a heating section 20 therein for heating the alloy to be heated coaxially with the heating chamber 10, and both of the chambers are connected via a cylindrical hollow connection section 60.

A side wall and a bottom wall of the heating chamber 10, an upper wall, a side wall, and a bottom wall of the cooling chamber 80, and a side wall of the connection section 60 which are connected to each other have a double structure respectively, and cooling water is supplied to a gap therebetween. A pipe-shaped water-cooled vertically movable shaft 90 penetrating through the bottom portion of the cooling chamber 80 and allowing passage of the cooling water therein is allowed to enter the heating chamber 10.

The heating section 20 disposed in the heating chamber 10 on the upper side employs an induction heating system in the present invention and, the configuration thereof will be described with reference to FIG. 2 (cross-sectional view) showing the heating section 20 in an enlarged scale.

Figure 2:
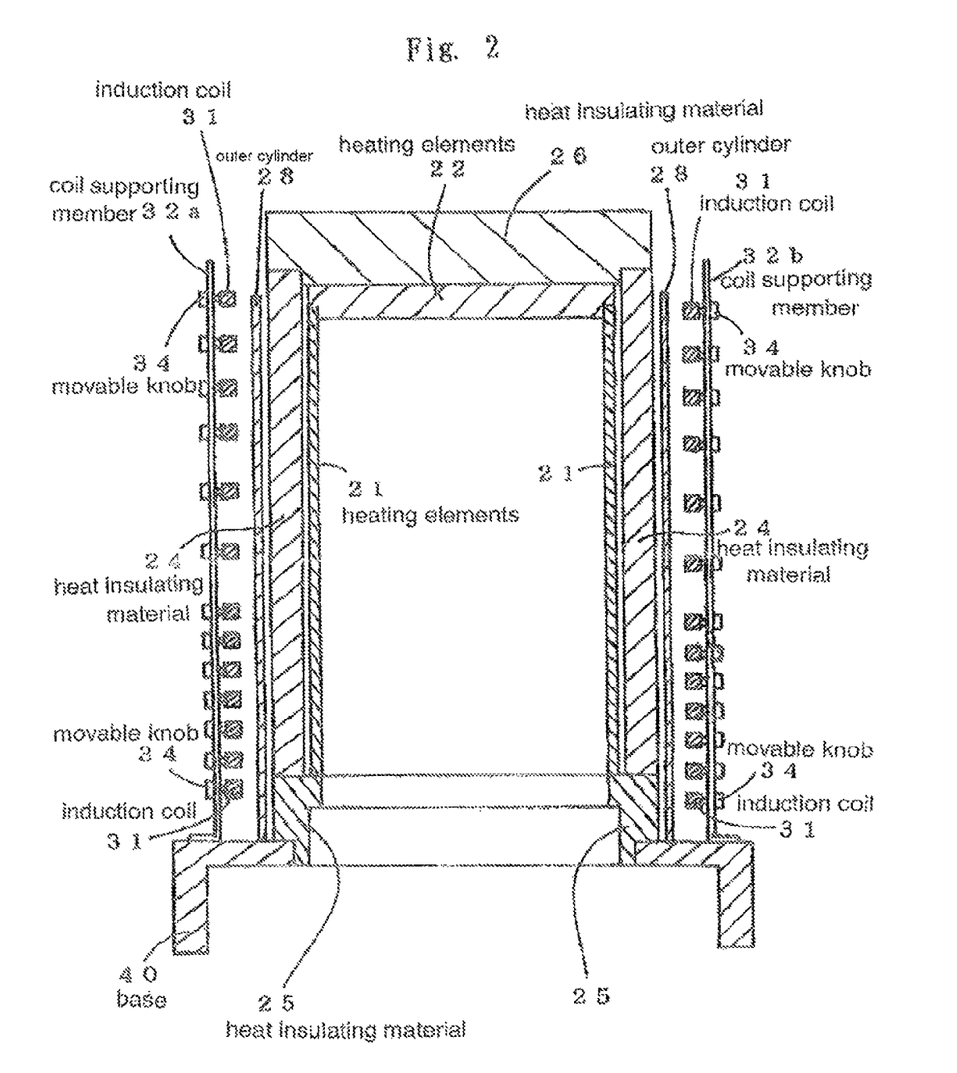
FIG. 2 is a cross-sectional view showing a configuration of a heating portion shown in FIG. 1 in an enlarged scale.

In FIG. 2, reference numeral 21 designates a heating element formed of high-purity carbon as a material and formed into a cylindrical shape, and an upper opening is closed by a disk-shaped heating element 22 formed also of high-purity carbon. A lower opening is configured to be closed by a disk-shaped heat generator 23 formed of high-purity carbon and interposed between a disk-shaped supporting base 91 (formed of mullite as a material) attached to an upper end of the water-cooled vertically movable shaft 90 and configured to support the alloy to be heated and a disk-shaped heat insulating material 27 when the water-cooled vertically movable shaft 90 is moved upward.

Figure 3:
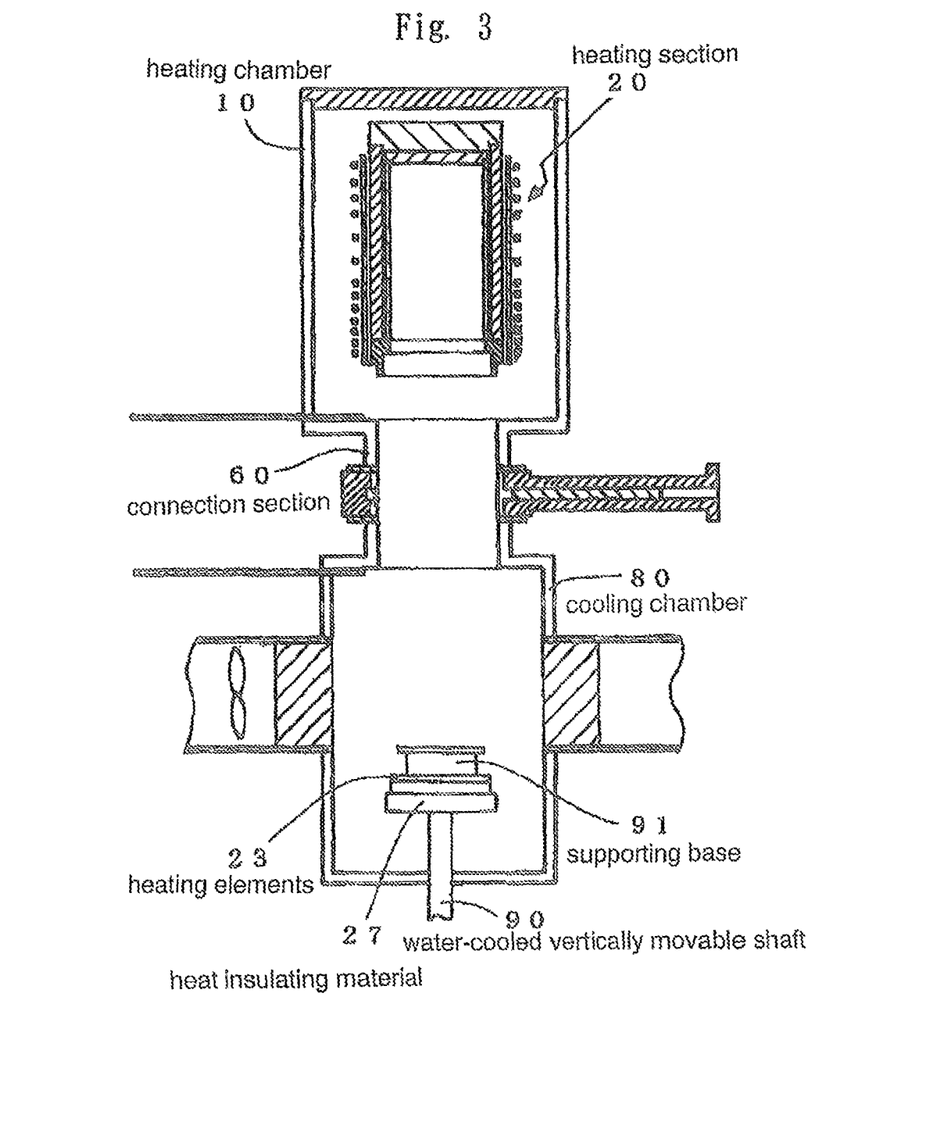
FIG. 3 is a configuration drawing showing a state in which a water-cooled vertically movable shaft shown in FIG. 1 is moved downward.

In FIG. 2, an outer peripheral wall of the cylindrical heating element 21 is surrounded by a cylindrical heat insulating material 24, and an upper surface of the disk-shaped heating element 22 is covered with a disk-shaped heat insulating material 26. A lower surface of the disk-shaped heat generator 23 (FIG. 3) on the lower side is covered with the disk-shaped heat insulating material 27 as shown in FIG. 3. Carbon felt is employed as a material of the respective heat insulating materials 24, 26 and 27 in this embodiment. The cylindrical heating element 21 is supported by a heat insulating material 25 having a ring-shape in plan view and being provided continuously under the cylindrical heat insulating material 24. The heat insulating material 25 is supported by a base 40 having a ring shape in plan view and provided with four legs, which is omitted from illustration in FIG. 1.

The cylindrical heat insulating material 24 surrounding the heating element 21 is surrounded by a cylindrical outer cylinder 28 formed of mullite as a material, and an induction coil 31 is disposed around the outer cylinder 28 so as to extend in the direction of the height of the outer cylinder 28. The induction coil 31 is supported by narrow plate-shaped coil supporting members 32a and 32b, not illustrated in FIG. 1.

Figure 4:
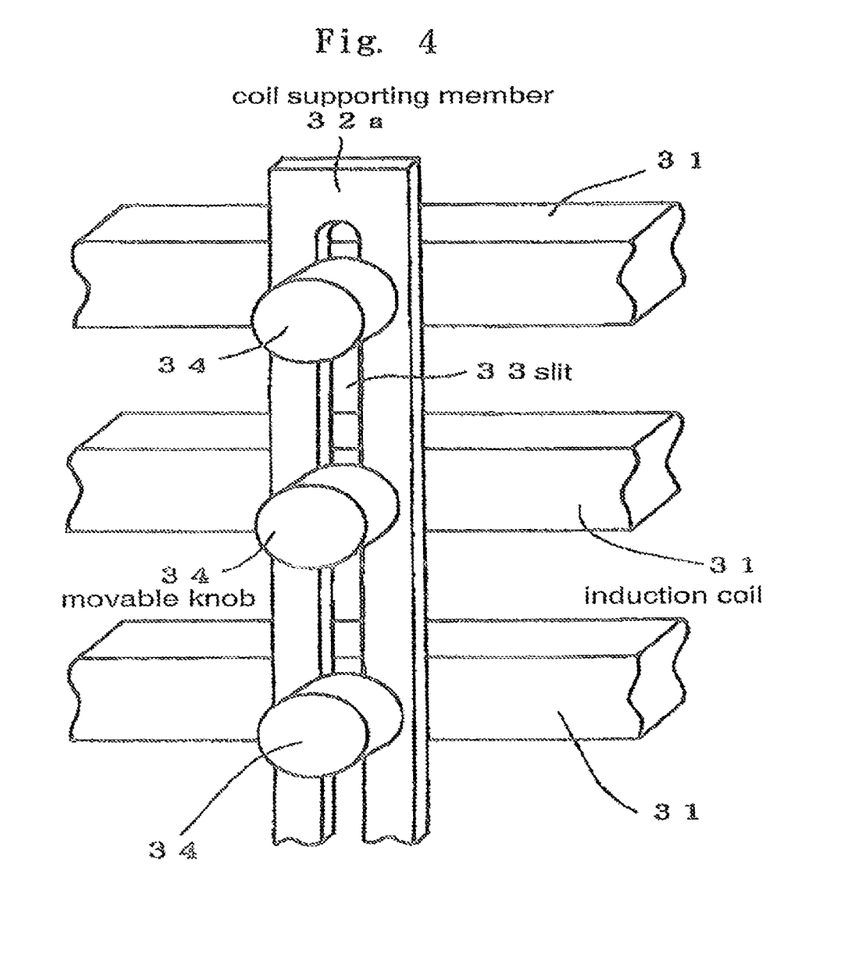
FIG. 4 is a partially perspective view showing a configuration for supporting an induction coil shown in FIG. 3.
Figure 5:
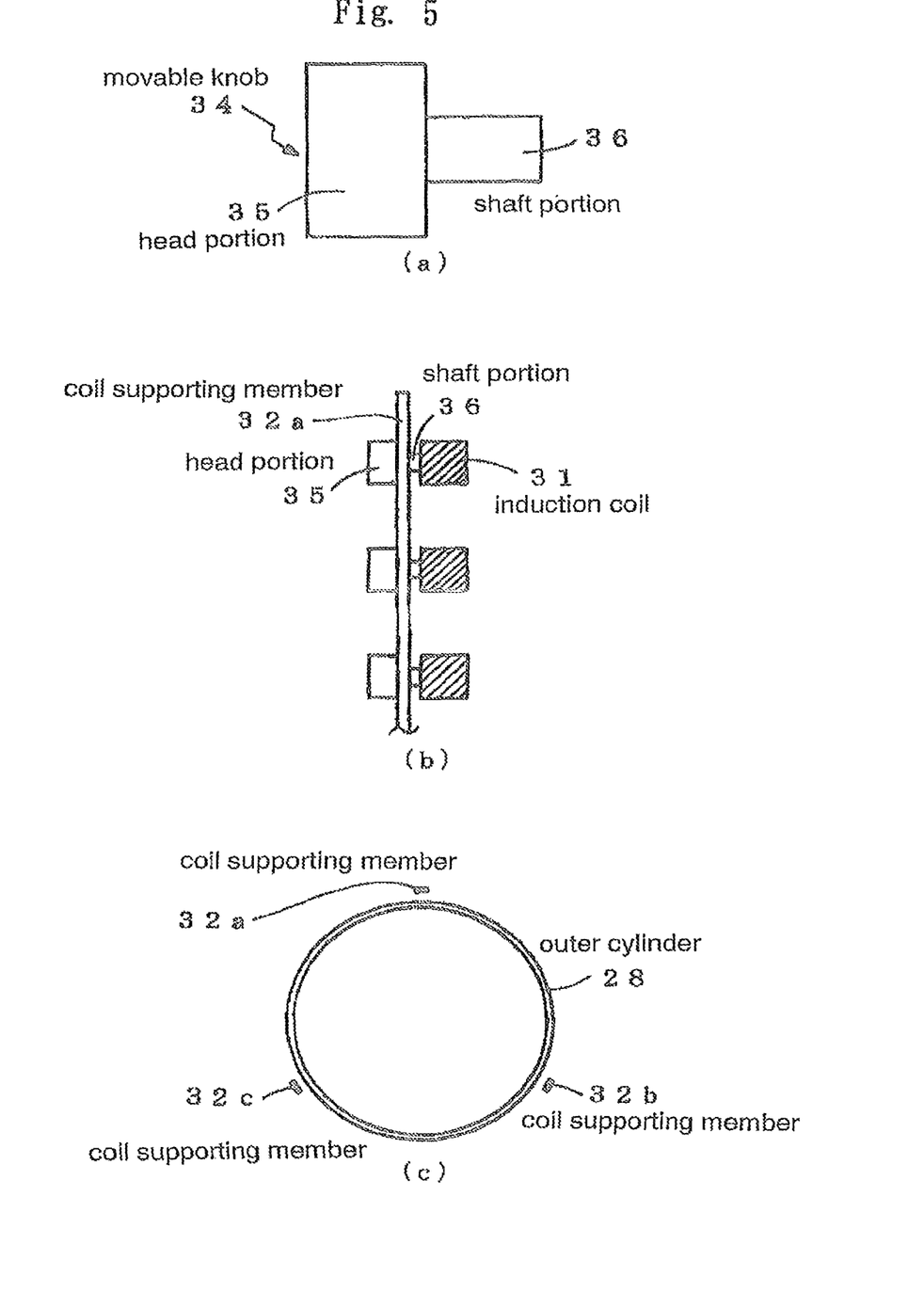
FIG. 5 is a configuration drawing showing a configuration of a component for supporting an induction coil shown in FIG. 3.

FIG. 4 (partly perspective view) shows a configuration in which the induction coil 31 is supported by the coil supporting members 32a and 32b. As illustrated, the coil supporting member 32a is formed with a slit 33 and, as shown in FIG. 5(a), shaft portions 36 of movable knobs 34 having a T-shape in side view are fitted into the slit 33 so as to be slidable therein. The shaft portions 36 of the movable knobs 34 are secured to the induction coil 31 by brazing as shown in FIG. 5(b).

Therefore, by holding a head portion 35 (FIG. 5(a)) of the movable knob 34 and moving the movable knob 34 in the vertical direction, the induction coil 31 is moved, and hence the pitches of the induction coil 31 can be adjusted as desired. For reference sake, as shown in FIG. 5(c) (plan view), there are three of the coil supporting members 32a to c arranged in the circumferential direction of the outer cylinder 28, and a lower end portion of each is fixed to the base 40 (FIG. 2).

Figure 6:
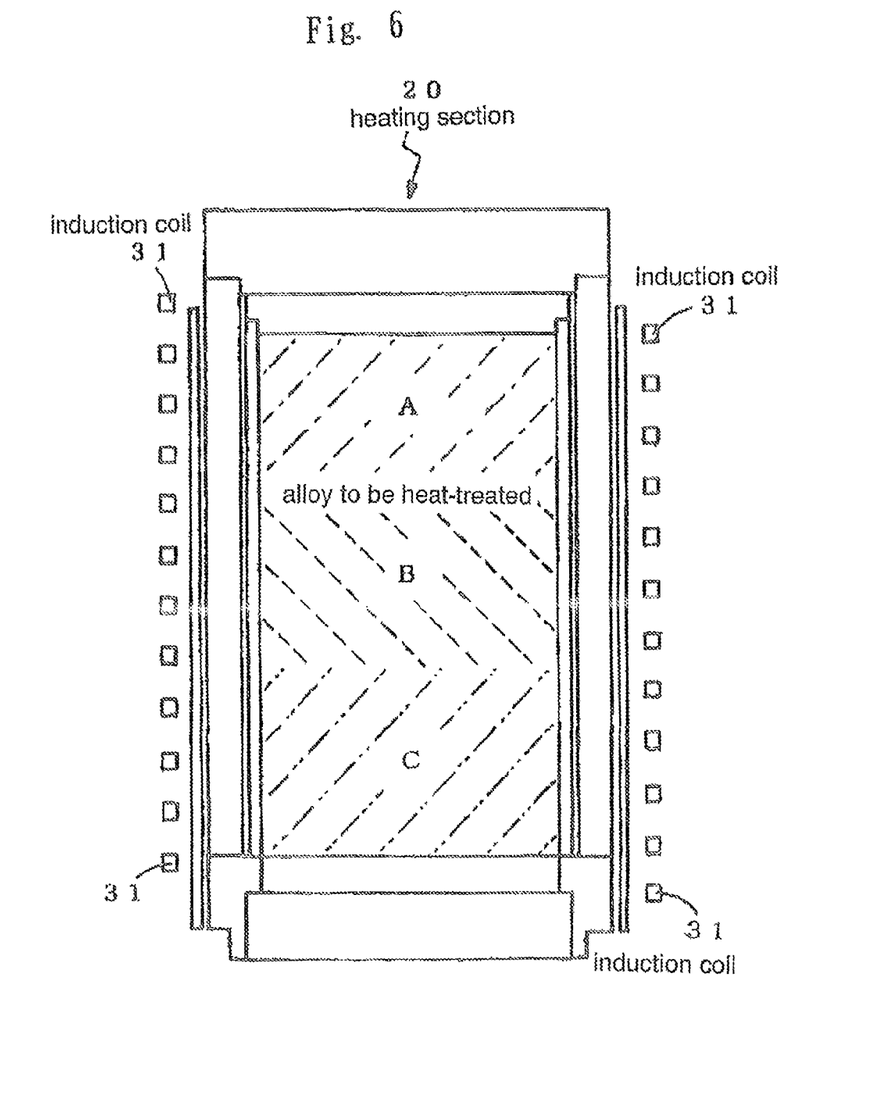
FIG. 6 is an explanatory drawing for explaining a temperature distribution in a heating portion when pitches of the induction coil shown in FIG. 3 are equalized.

Here, if all the pitches are set to be equal, the temperature distribution in a space of the heating section 20 does not become equal, and hence uniform heating property cannot be achieved. In other words, when all the pitches of the induction coil 31 are uniform, the temperature in a portion B in a middle layer indicated by parallel oblique broken lines is the highest, the temperature in a portion A in an upper layer indicated by parallel oblique chain lines is lower than that in the portion B in the middle layer, and the temperature C indicated by parallel oblique double-dashed chain lines is further lower than that in the portion A in the upper layer. This is caused by a fact that heat in the portion A in the upper layer escapes upward because an upper portion of the outer cylinder 28 (FIG. 2) is opened, and is closer to the atmospheric air at a normal temperature, and the water-cooled vertically movable shaft 90 (FIG. 1) which has cooling water passing therein is located in the proximity of the portion C in the lower layer.

Therefore, the narrower the pitches of the induction coil 31, the more the heating temperature is increased. Therefore, the pitches in the portion B in the middle layer are set to be wide, the pitches in the portion A in the upper layer are set to be slightly narrower, and the pitches in the portion C in the lower layer are set to be narrower than those in the portion A.

The values of the pitches of the induction coil 31 are different depending on the sizes and shapes of the alloy to be heated. Therefore, when setting the pitches, the alloy to be heated is heated with the uniform pitches, then the temperature distribution in the space in the interior of the heating section 20 is measured, and then the pitches are set on the basis of the measured values.

In this manner, by setting the pitches of the induction coil 31 according to the sizes or the shapes of the alloy to be heated, even when the induction heating system, which is limited in application because the temperature control is not easy, is employed, sufficient effectiveness is demonstrated in the heat treatment of metals.

In FIG. 1, a heat shield panel 50a, which is movable leftward and rightward on the drawing and is configured to block radiated heat from the heating chamber 10, is disposed on a lower end portion of the heating chamber 10 having the heating section 20 configured as described above is provided therein. A vacuum gate valve 70 having a disk-shaped movable gate 71, which is configured to partition between the heating chamber 10 and the cooling chamber 80 and separate the atmospheres in both of the chambers, is disposed at a middle portion of the connection section 60 which connects the heating chamber 10 and the cooling chamber 80 provided below.

In contrast, a heat shield panel 50b, which is movable leftward and rightward on the drawing, is disposed on an upper end portion of the cooling chamber 80. The heat shield panel 50b here is configured to protect the vacuum gate valve 70, which does not offer sufficient heat resistance to high temperatures in cooperation with the heat shield panel 50a disposed on the lower end portion of the heating chamber 10.

In addition, the cooling chamber 80 is provided with a gas introducing pipe 81 opening on the side surface thereof so as to introduce cooling gas into the cooling chamber 80 and, in the interior of the gas introducing pipe 81, a fan 82 for pumping gas and a heat exchanger 83a for cooling the gas are disposed. Also, the cooling chamber 80 is also provided with a gas exhaust pipe 84 on the side surface thereof so as to exhaust the gas introduced into the cooling chamber 80, at a position opposing the gas introducing pipe 81 and, in the interior thereof, a heat exchanger 83b is disposed. The gas exhausted from the cooling chamber 80 is circulated and used as the gas to be introduced into the cooling chamber 80. The heat exchangers 83a and 83b may be provided not in both of the gas introducing pipe 81 and the gas exhaust pipe 84, but may be in one of them.

Figure 7:
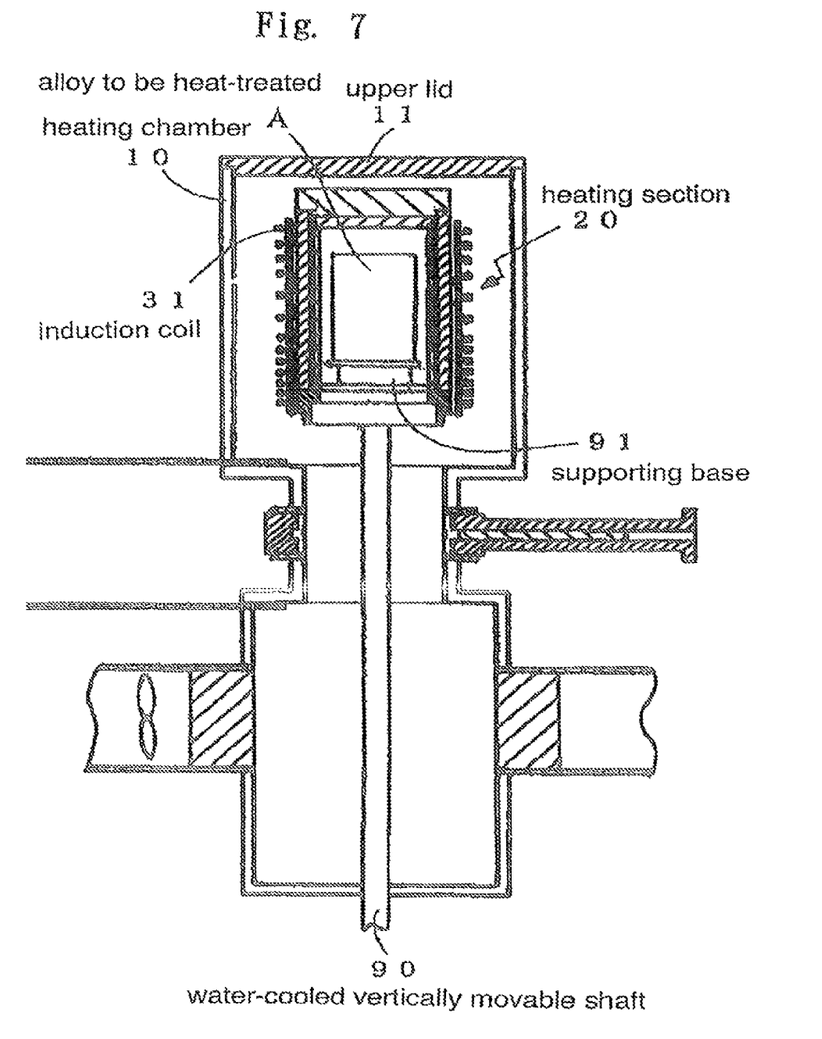
FIG. 7 is an explanatory drawing showing a state in which an alloy to be heated is heated in the heat treatment furnace shown in FIG. 1.

FIG. 7 shows a state in which the alloy to be heated is heated using the heat treatment furnace configured as described above. In a case where the alloyA to be heat-treated is heated, the water-cooled vertically movable shaft 90 is moved upward, and causes the supporting base 91 which is fixed to the upper end thereof and supports the alloy to be heated to enter the space in the interior of the heating section 20 provided in the heating chamber 10 and then the alloyA to be heat-treated is placed on the supporting base 91. Mounting of the alloyA to be heat-treated onto the supporting base 91 is performed by removing a disk-shaped upper lid 11 of the heating chamber 10. When the required work is completed, the air is exhausted via an exhaust port, not illustrated, opening into the heating chamber 10, so as to evacuate the air from the heating chamber 10 and the cooling chamber 80.

Then, a high-frequency current having a frequency of, for example, 1 kHz is fed to the induction coil 31 to heat the interior of the heating section 20 to a temperature, for example, on the order of 1300° C. At this time, the pitches of the induction coil 31 are not equidistant, but are adjusted so as to obtain an uniform temperature distribution in the interior of the heating section 20, whereby the uniform heating property is ensured in a range of ±5° C.

Figure 8:
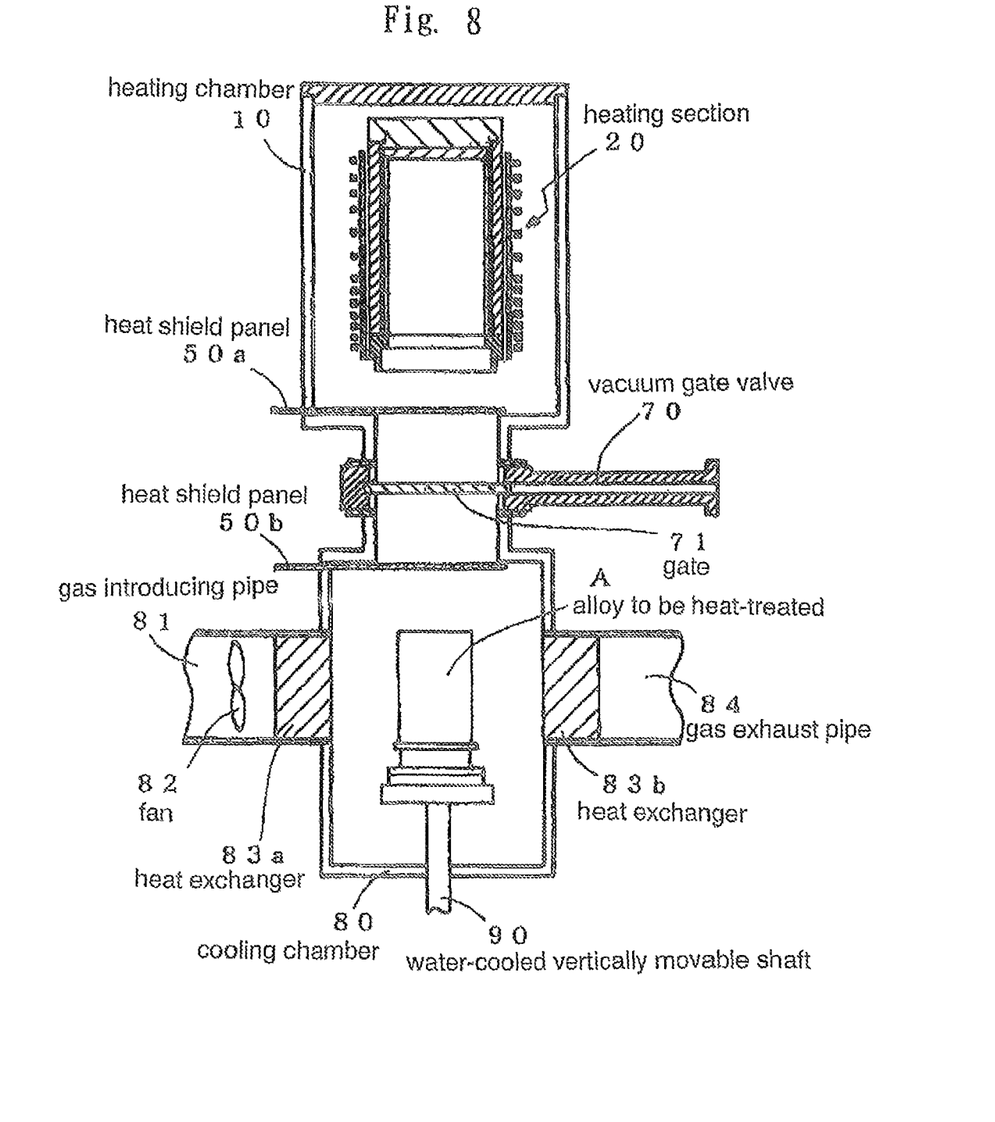
FIG. 8 is an explanatory drawing showing a state in which the alloy to be heated is cooled in the heat treatment furnace shown in FIG. 1.

When a certain period has elapsed in this state, the water-cooled vertically movable shaft 90 is moved downward and the alloyA to be heat-treated is moved into the cooling chamber 80 as shown in FIG. 8. Simultaneously, heat shield panels 50a, 50b and the gate 71 of the vacuum gate valve 70 are caused to jut out respectively.

Then, the cooling gas flowing via the gas introducing pipe 81 is fed into the cooling chamber 80 via the heat exchanger 83a by driving the fan 82 to cool down the alloyA to be heat-treated. The gas fed into the cooling chamber 80 is cooled by the heat exchanger 83b disposed at the opening of the gas exhaust pipe 84, and is exhausted from the cooling chamber 80, and then is circulated and guided to the gas introducing pipe 81 and then is fed into the cooling chamber 80.

Here, the cooling gas is not limited to inert gas such as He gas or Ar gas. In the related art shown in FIG. 10, for example, $N_2$ gas cannot be used because it may give damage to a resistance heating element 211 formed of W or Mo. In the cooling chamber 80 of the heat treatment furnace according to the present invention, however, there is no such a risk and hence the inexpensive $N_2$ gas can be used.

The speed of cooling the alloyA to be heat-treated cooled in this manner is 400° C./min. in a case of a heating temperature of approximately 1350° C. according to the experiment conducted by the inventor of the present application. Therefore, in comparison with the case of the related art shown in FIG. 10 in which the cooling speed is 150° C./min., an extremely high cooling speed is realized.

Although the heat treatment furnace according to the present invention can be used in heat treatment of metal such as steel or the like, when performing the heat treatment on the metal which is vulnerable to carburizing such as steel, it can be dealt with by applying a coating of SiC (silicon carbide) on carbon used for the heating elements 21 to 23.

In the description given above, the heating element 21 is formed into a cylindrical shape, and the case where the heating elements 22 and 23 which cover the upper and lower opening are formed into a disk shape has been exemplified. However, the present invention is not limited thereto. The present invention is also applicable to other cases such as a case where the heating elements are formed into a square tube shape, for example, and the heating elements which close the upper and lower openings are formed into a shape corresponding to the shapes of the openings.

Figure 9:
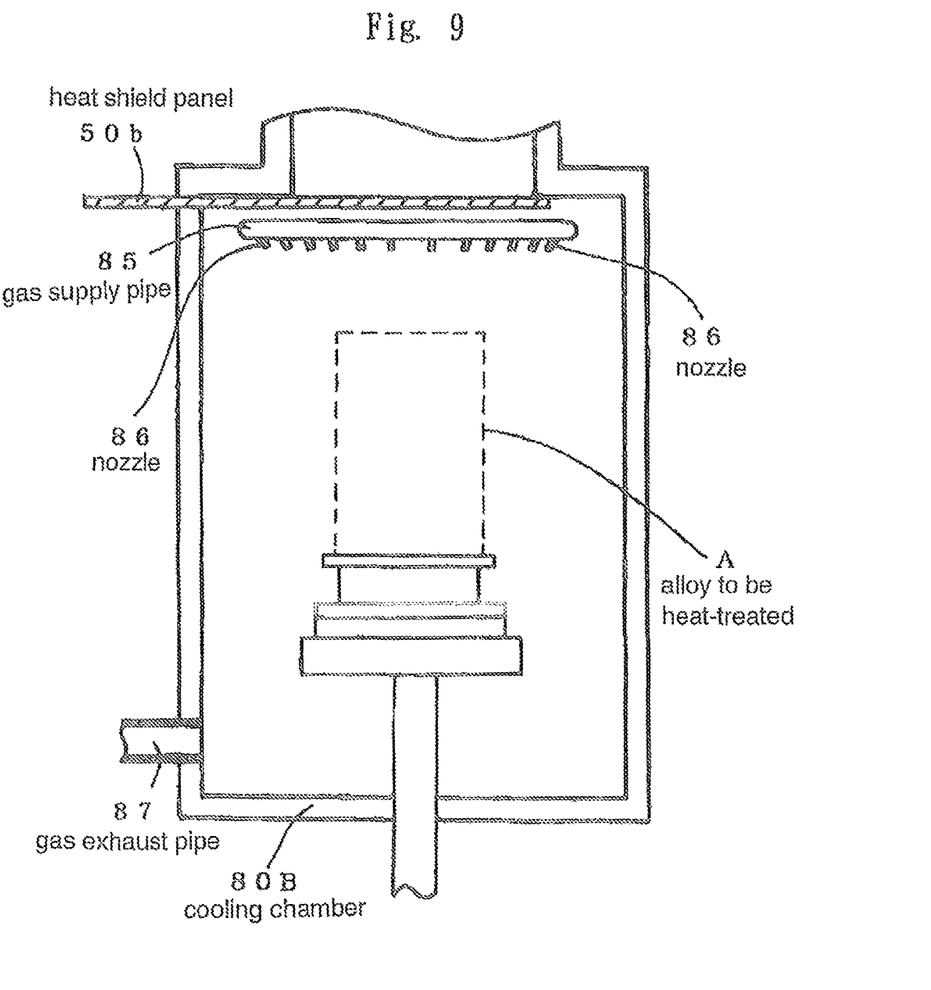
FIG. 9 is a partial cross-sectional view showing another configuration for cooling the heated alloy to be heated.

As a configuration for cooling the heated alloyA to be heat-treated, the case where the gas introducing pipe 81, the fan 82, the gas exhaust pipe 84, and the heat exchangers 83a, 83b are disposed in the cooling chamber 80 has been described. However, and the present invention is not limited thereto. For example, as shown in FIG. 9 (partly cross-sectional view), the invention includes a configuration in which a gas supply pipe 85 having a ring shape in plan view is disposed below the heat shield panel 50b which juts out above a cooling chamber 80B, a plurality of nozzles 86 configured to eject cooling gas into a conical shape are provided at a predetermined angle (for example, 45°) so as to be directed respectively toward the alloyA to be heat-treated shown by a broken line, and a gas exhaust pipe 87 opening at a lower portion in the cooling chamber 80B is provided.

In addition, although the case where the cooling gas is introduced into the cooling chamber 80 has been described, the present invention is not limited thereto. According to the experiment conducted by the inventor of the present application, even without the cooling gas, the speed of cooling the heated alloyA to be heat-treated is 300° C./min. or faster with a heating temperature of 1300° C., and a cooling speed higher than the case of the related art shown in FIG. 10 is obtained. Therefore, even when the disposition of the gas introducing pipe 81, the fan 82, the gas exhaust pipe 84, and the respective heat exchangers 83a and 83b in the cooling chamber 80 is omitted, the lowering of the running cost and improvement of the cooling speed, which is the object of the present invention, is achieved.

Reference numerals in the drawings designates following components.

10 heating chamber
   11 upper lid
   20 heating section
   21-23 heating elements
   24-27 heat insulating material
   24 outer cylinder
   31 induction coil
   32a-32c coil supporting member
   33 slit
   34 movable knob
   35 head portion
   36 shaft portion
   40 base
   50a, 50b heat shield panel
   60 connection section
   70 vacuum gate valve
   71 gate
   80,80b cooling chamber
   81 gas introducing pipe
   82 fan
   83a, 83b heat exchanger
   84 gas exhaust pipe
   85 gas supply pipe
   86 nozzle
   87 gas exhaust pipe
   90 water-cooled vertically movable shaft
   91 supporting base
   100 heating chamber
   111 resistance heating element
   121-123, 131-133 heat insulating panels
   A alloy to be heated

The invention claimed is:

1. A metal heat treat furnace comprising:
an internal heating chamber configured to heat metal to be heat-treated and having a heating portion including a coil supported so that pitches thereof can be adjusted as desired according to sizes or shapes of alloy to be heated and a heating element made of carbon which generates heat when an electric current is fed to the coil;
a cooling chamber provided below the heating chamber and configured to cool the metal to be heat-treated, which has been heated by the heating portion;
a hollow connection section having a heat insulating function configured to connect the heating chamber and the cooling chamber and provided with a movable gate which partitions the heating chamber and the cooling chamber;
a first movable heat-shield panel arranged in a lower portion in the heating chamber and configured to shield heat from the heating chamber;
a second movable heat-shield panel arranged in an upper portion in the cooling chamber and configured to shield heat of the heated metal to be heat-treated from being transferred to the gate; and
a water-cooled vertically movable shaft disposed through the bottom portion of the cooling chamber, the water-cooled vertically movable shaft being configured to be capable of supporting the metal to be heat-treated and entering the heating chamber,
wherein when pitches of the coil are adjusted so as to make the temperature distribution in the interior of the heating portion uniform in a state in which the alloy to be heated is loaded in the heating chamber, uniform heating property, is ensured in the range of ±5° C.

2. The metal heat treat furnace of claim 1, comprising:
a gas introducing pipe provided with a fan therein in order to obtain a cooling speed involving the strength of the alloy caused by metal heat treatment, the fan being configured for the cooling chamber to pump gas for cooling the heated metal to be heat-treated, which is supported by the water-cooled vertically movable shaft and moved from the heating chamber to the cooling chamber, into the interior of the cooling chamber;
a gas exhaust pipe configured to exhaust the gas introduced into the cooling chamber through the gas induction pipe from the cooling chamber; and
a heat exchanger configured to exchange heat with the gas disposed in an interior of at least one of the gas introducing pipe and the gas exhaust pipe.

3. The metal heat treat furnace of claim 2, comprising:
a ring-shaped gas supply pipe configured to supply the gas for cooling the heated metal to be heat-treated in the cooling chamber, the gas supply pipe having a number of nozzles configured to eject the gas supplied thereto via the gas supply pipe in order to control the cooling speed involving the strength of the alloy caused by the metal heat treatment; and
a gas exhaust pipe configured to exhaust the gas ejected via the nozzles,
wherein the cooling speed with a heating temperature of approximately 1300° C. is 300° C./min. or higher.

4. The metal heat treat furnace of claim 1, comprising:
a ring-shaped gas supply pipe configured to supply the gas for cooling the heated metal to be heat-treated in the cooling chamber, the gas supply pipe having a number of nozzles configured to eject the gas supplied thereto via the gas supply pipe in order to control the cooling speed involving the strength of the alloy caused by the metal heat treatment; and
a gas exhaust pipe configured to exhaust the gas ejected via the nozzles,
wherein the cooling speed with a heating temperature of approximately 1300° C. is 300° C./min. or higher.

5. The metal heat treat furnace of claim 1, further comprising a vacuum gate valve for establishing a vacuum in the heating chamber.

6. A metal heat treat furnace comprising:
a coil supporting member;
a heating chamber configured to heat metal to be heat-treated and having a heating portion including a coil supported so that pitches of the coil can be adjusted as desired and a heating element made of carbon which generates heat when an electric current is fed to the coil, the pitches of the coil being adjusted by a vertical movement of the coil in a state of being fitted into a slit of the coil supporting member,
a movable knob slidable in a vertical direction and connected to the coil such that operation of the movable knob moves the coil,
a cooling chamber provided below the heating chamber and configured to cool the metal to be heat-treated, which has been heated by the heating portion;
a hollow connection section configured to connect the heating chamber and the cooling chamber and provided with a movable gate which partitions the heating chamber and the cooling chamber;
a first movable heat-shield panel arranged in a lower portion in the heating chamber and configured to shield heat from the heating chamber;
a second movable heat-shield panel arranged in an upper portion in the cooling chamber and configured to shield heat of the heated metal to be heat-treated from being transferred to the gate; and
a water-cooled vertically movable shaft disposed through the bottom portion of the cooling chamber, the water-cooled vertically movable shaft being configured to be capable of supporting the metal to be heat-treated and entering the heating chamber.

7. The metal heat treat furnace of claim 6, comprising:
a gas introducing pipe provided with a fan therein in order to obtain a cooling speed involving the strength of the alloy caused by metal heat treatment, the fan being configured for the cooling chamber to pump gas for cooling the heated metal to be heat-treated, which is supported by the water-cooled vertically movable shaft and moved from the heating chamber to the cooling chamber, into the interior of the cooling chamber;
a gas exhaust pipe configured to exhaust the gas introduced into the cooling chamber through the gas induction pipe from the cooling chamber; and
a heat exchanger configured to exchange heat with the gas disposed in an interior of at least one of the gas introducing pipe and the gas exhaust pipe.

8. The metal heat treat furnace of claim 7, comprising:
a ring-shaped gas supply pipe configured to supply the gas for cooling the heated metal to be heat-treated in the cooling chamber, the gas supply pipe having a number of nozzles configured to eject the gas supplied thereto via the gas supply pipe in order to control the cooling speed involving the strength of the alloy caused by the metal heat treatment; and
a gas exhaust pipe configured to exhaust the gas ejected via the nozzles, wherein the cooling speed with a heating temperature of approximately 1300° C. is 300° C./min. or higher.

9. The metal heat treat furnace of claim 6, comprising:

a ring-shaped gas supply pipe configured to supply the gas for cooling the heated metal to be heat-treated in the cooling chamber, the gas supply pipe having a number of nozzles configured to eject the gas supplied thereto via the gas supply pipe in order to control the cooling speed involving the strength of the alloy caused by the metal heat treatment; and a gas exhaust pipe configured to exhaust the gas ejected via the nozzles, wherein the cooling speed with a heating temperature of approximately 1300° C. is 300° C./min. or higher.

10. The metal heat treat furnace of claim 6, wherein the coil supporting member is narrow and plate-shaped, and wherein the movable knob includes a shaft portion to which the coil is secured.

\* \* \* \* \*